Dec. 16, 1969   J. N. McGUIRE ET AL   3,484,607
APPARATUS PRODUCING RADIANT ENERGY AT AN EXIT FACE FROM
STIMULATION OF A LUMINOPHOR THROUGH THE
PHENOMENON OF DIELECTRIC TRAPPING
Filed Jan. 30, 1968   5 Sheets-Sheet 1
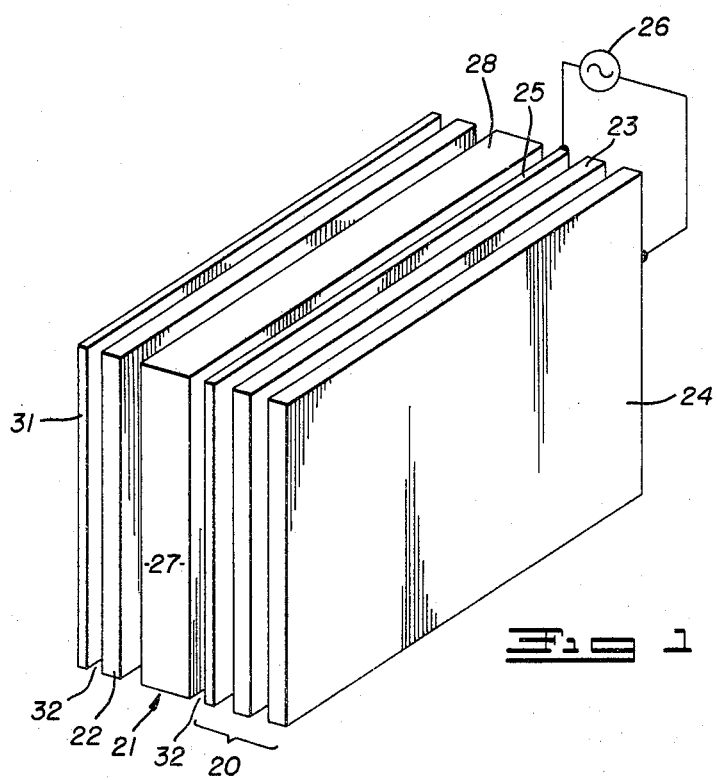
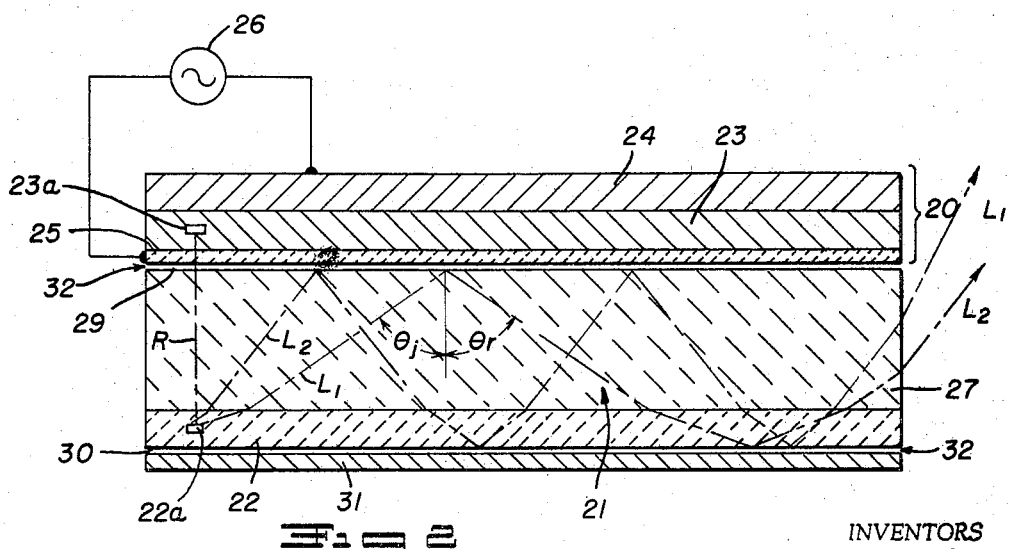
INVENTORS
JOHN N. McGUIRE &
KENNETH P. LALLY
BY MAHONEY, MILLER & RAMBO
ATTORNEYS

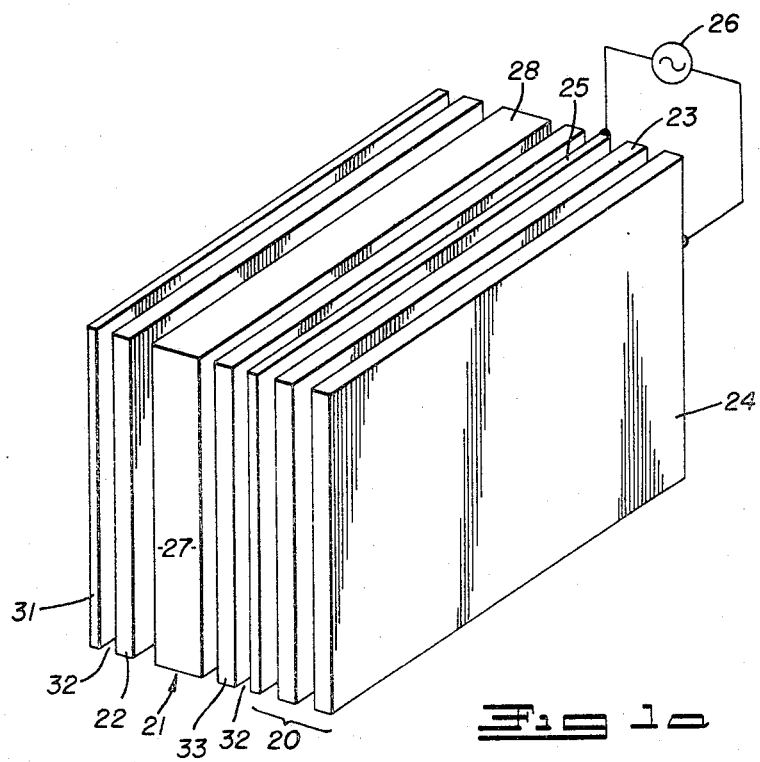
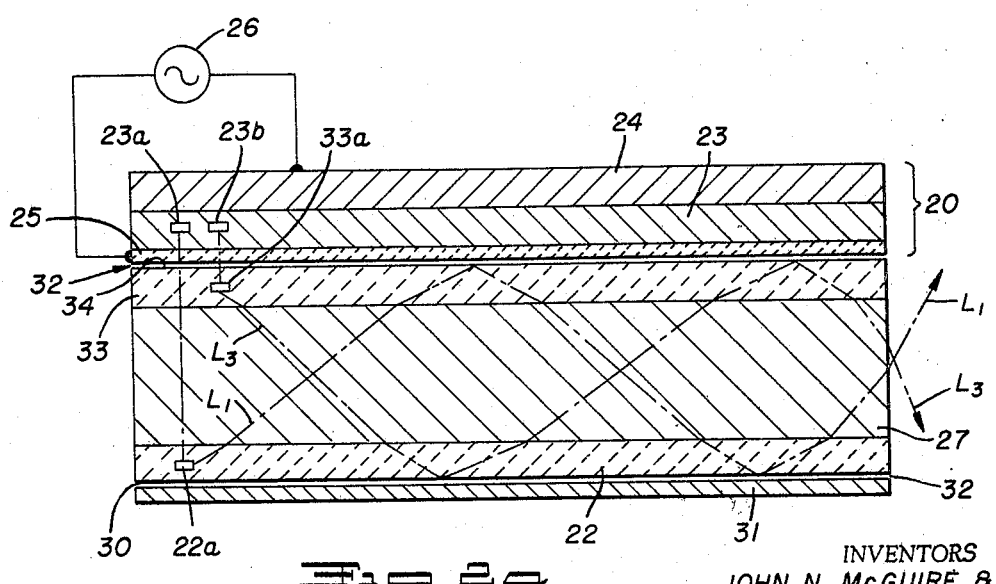

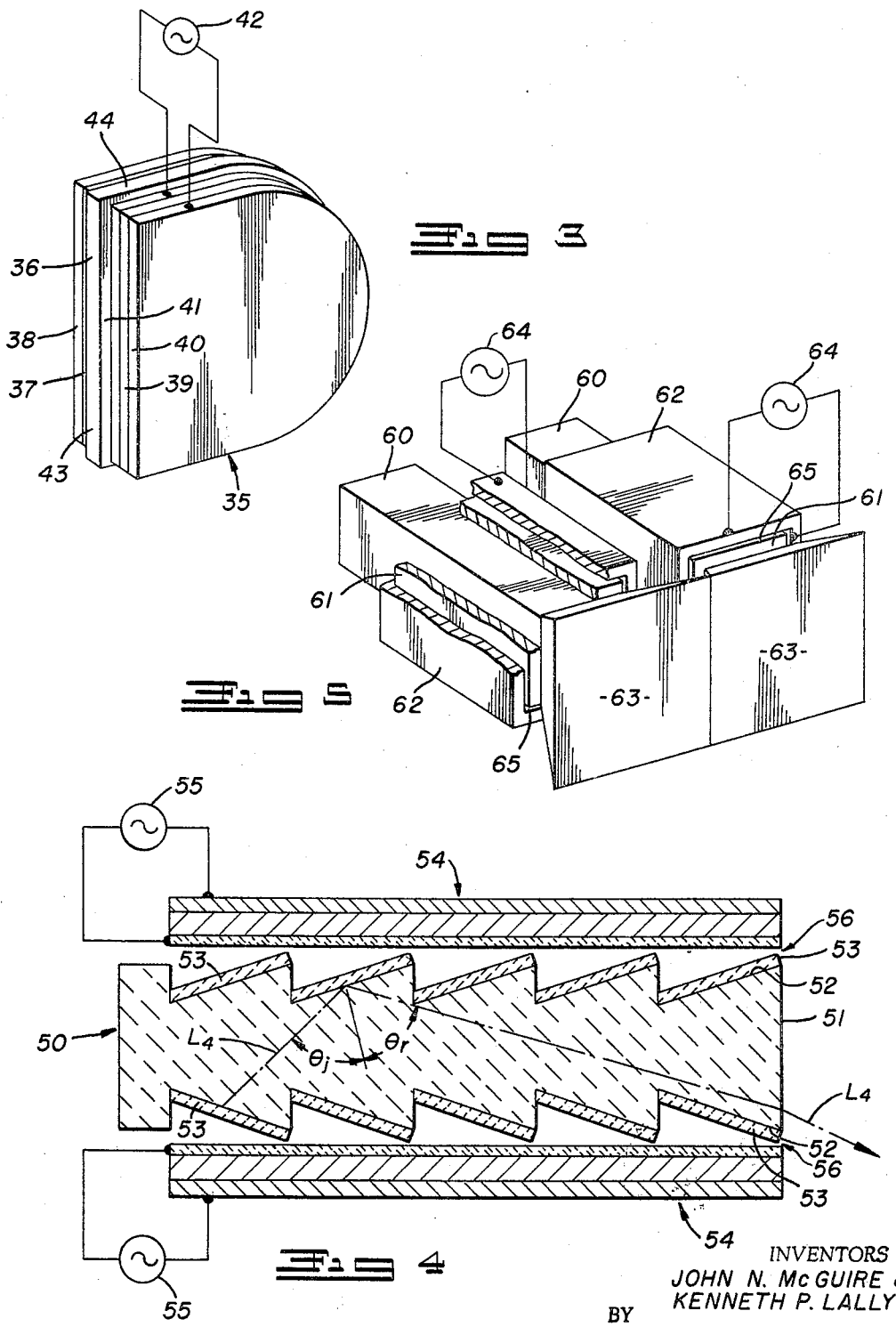

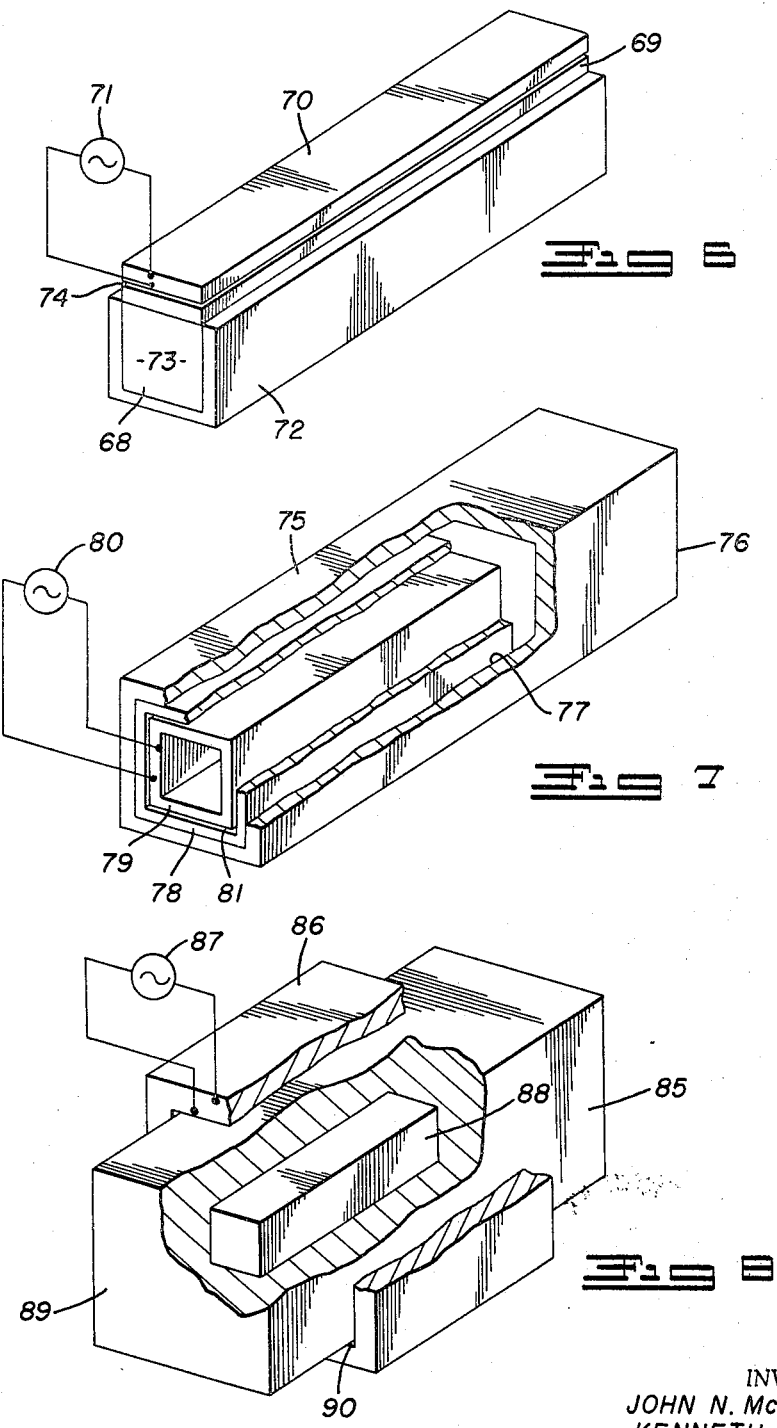

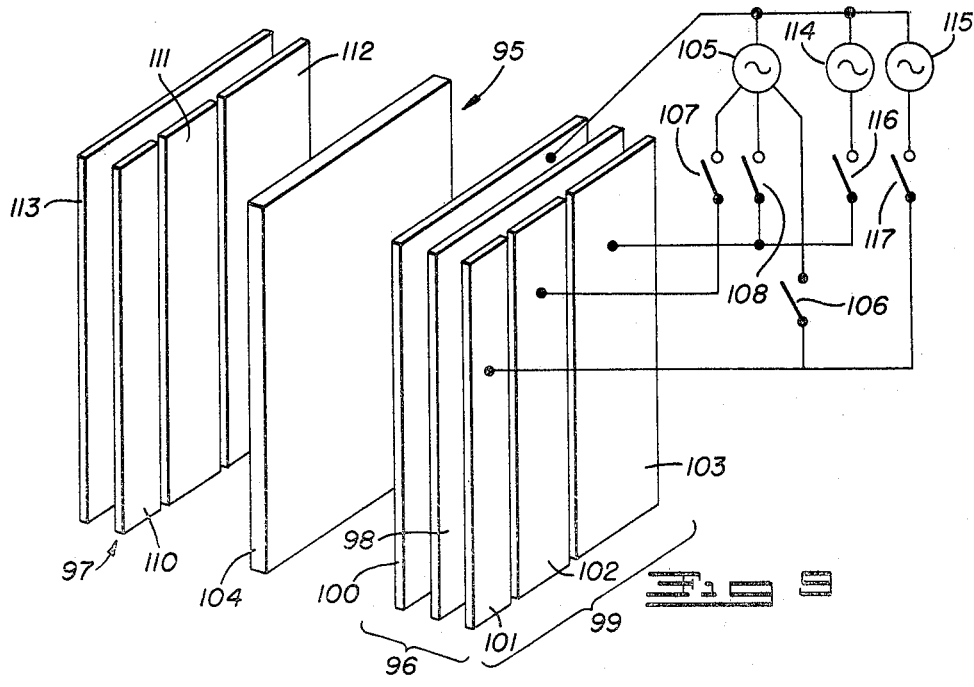
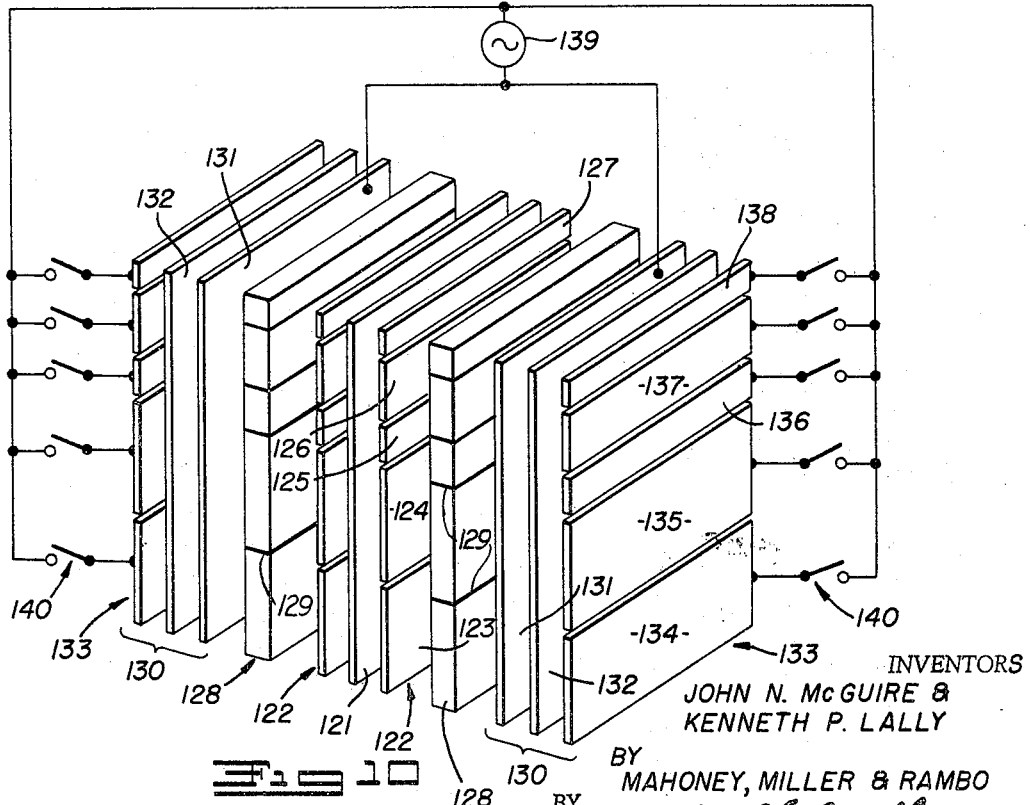
INVENTORS
JOHN N. McGUIRE &
KENNETH P. LALLY
BY
MAHONEY, MILLER & RAMBO
ATTORNEYS

United States Patent Office 3,484,607
Patented Dec. 16, 1969

3,484,607
APPARATUS PRODUCING RADIANT ENERGY AT AN EXIT FACE FROM STIMULATION OF A LUMINOPHOR THROUGH THE PHENOMENON OF DIELECTRIC TRAPPING
John N. McGuire and Kenneth P. Lally, Smithtown, N.Y., assignors to Mid-Continent Manufacturing Co., Columbus, Ohio, a corporation of Ohio
Filed Jan. 30, 1968, Ser. No. 701,629
Int. Cl. G02b 5/14; F21k 2/00
U.S. Cl. 250—71                 18 Claims

ABSTRACT OF THE DISCLOSURE

Isotropic radiant energy induced in a solid-form conduit is optically transmitted throughout the volume of the conduit by stimulated emission from a distributed luminophor which is optically coupled to the conduit. By the subsequent action of dielectric reflection from the bounding conduit surfaces, a selective accumulation of luminous flux is favored along the longitudinal axis of the conduit. At the surface area representing the conduit termination, the accumulated flux is emitted at a flux density which can be substantially higher than that of the causative source. This phenomena will be subsequently referred to as edge emission.

GENERAL DISCUSSION OF ELECTROLUMINESCENT DISPLAYS

The radiant energy referred to is stimulated emission from a distributed luminophor which is optically coupled to the conduit as a specular surface film or coating, or as an inclusion in the conduit. The luminophor is responsive to excitation from incident energy generated by sources outside the conduit. When formed as a transparent body, the stimulated emission from a luminophor is of an isotropic or equiangular distributional characteristic, quite different from normal diffusely emitting sources. Thus, in contrast to most normal sources, substantial fractions of the radiant energy will be subject to sustained dielectric reflection between bounding surfaces. Since these bounding surfaces are coextensive with the longitudinal axis of the conduit, such reflections will accumulate flux along the axis to the point of conduit termination, resulting in release of this flux at the termination surface. Internal reflection is optimized through selection of materials which maximize the difference in optical index of refraction at conduit interface surfaces and through appropriate configuring of the conduit surfaces. Several such luminophors may be placed on a single conduit to obtain a controllable variety of wavelengths in the conduit output spectrum.

Intensity at the output surface is both a function of input source intensity and the amount of area allotted to the luminophor, thus permitting design means for obtaining balanced outputs of spectral variety from several luminophors at high intensity, regardless of variations in the efficiency of individual luminophors. Polychromatic outputs can be thus obtained from monochromatic inputs or sources of a single spectral type. Outputs are characterized by intense color saturation in consonance with the relatively sharp molecular resonance spectra of the luminophors.

Radiant energy display apparatus, such as the well known electroluminescent lamps, are normally limited in output amplitude and wavelength of radiant energy due to constructional and physical limitations of such devices. An electroluminescent lamp utilized for display purposes in a common constructional form will comprise a layer of electroluminescent phosphor interposed between two planar electrodes. Application of an electric potential of suitable voltage and frequency across the electrodes will excite the intermediately disposed electroluminescent phosphor resulting in emission of radiant energy. By making at least one of the planar electrodes transmissive of the emitted radiant energy, a source of radiant energy is formed with the radiant energy being emitted as from the surface of this structure. The energy output of such a structure is dependent upon the applied electric potential and, in general, an increase in the applied electric potential will result in an increase in the radiant energy output. There is a practical limit as to the maximum output obtainable from a normal electroluminescent device due to the limiting voltage that may be applied without destructively affecting the electroluminescent structure. In addition to destructive effects that may result from the application of relatively high electric potentials, the application of such high potentials will materially reduce the life expectancy of the electroluminescent structures. The emitted energy is also restricted to wavelengths in those bands associated with the activating phosphor-dopants or mixtures thereof. Other types of radiant energy sources are similarly restricted in output amplitude or wavelength.

GENERAL DESCRIPTION OF THIS INVENTION

The apparatus of this invention is designed to provide a higher intensity radiation output utilizing a radiant energy source such as an electroluminescent lamp without subjecting the radiant energy source to extremely high electric potentials with the consequent destructive effects. This increase in the output obtainable is attained through the utilization of a secondary emitter which is responsive to the output emission from a primary emitter and incorporating edge-emission techniques to further increase the output. The apparatus of this invention is also designed to alter the wavelength distribution-characteristics of the output from that present in the energy of the primary emitter on a selectable basis. In its basic form, the apparatus of this invention comprises a primary radiant energy source which emits radiation and utilizes this radiation to excite a secondary emitter into emission. Radiant energy thus emitted by the secondary emitter is introduced into a conduit capable of optically transmitting the secondary radiation to an edge-emission surface. Utilizing a relatively large area for introducing the secondary radiation into the conduit and confining the radiation during transmission to a small edge surface for emission will result in a relatively high concentration of radiant energy at the point of emission. This secondary emitter is a radiation emitting luminophor having fluorescent characteristics and when optically transparent emits radiation in a substantially uniform or isotropic intensity pattern irrespective of the angle of observation. Secondary radiant energy will thus be internally reflected to a relatively large degree in a conduit of appropriate selected index of refraction compared to the surrounding medium and will produce the desired transmission characteristics for this device.

While this basic description of the apparatus and the subsequent detailed specification of the several embodiments illustrated herein are directed to devices which incorporate electroluminescent radiation sources in a visual display device, it will be understood that this is by way of example and not a limitation on the scope of the invention. For example, the radiant energy source may be other than electroluminescent or provide energy of wavelengths substantially different from that obtainable with the known electroluminescent devices and apparatus embodying this invention may be constructed which will not be of the visual display type. The radiant energy output may well be of wavelengths which are in radiation spectrums at either side of the visible spectrum and suitable detector devices responsive to the specific wavelengths may also be incorporated in or associated with the resultant device.

The enhancement of radiation output from the apparatus utilizing edge-emission techniques is not attainable without incorporation of utilization of a secondary emitter, such as emitter having fluorescent characteristics. In the case of an electroluminescent radiation source, the radiation is emitted in a non-uniform intensity pattern characterized as lambertian, i.e., with flux density at a given angle proportional to the cosine of the angle from an axis erected normal to the plane of emission. The majority of radiation is thus emitted in a direction normal to the surface of an electroluminescent radiator. For this reason and because such a source is an optically diffuse surface, the phenomenon of internal reflection may not be directly used to intensify such radiation. The reason for this is that most of the radiation from such a source penetrating an adjacent conduit, such as is proposed in connection with this apparatus, and which is in optical contact with the electroluminescent radiator, will be at distributional angles closer to the normal than the critical angle necessary for internal reflection, and thus will transmit through the conduit's bounding surface. The small percentage of energy which lies at distributional angles further from the normal than the critical angle will be internally reflected, but not on a sustained basis, since these rays will again encounter the diffusely scattering plane of the electroluminescent phosphor, altering their reflection angles to lambertian form once again. This phenomena is familiarly observed as halation. If the adjacent conduit is not optically immersed on the electroluminescent source, the conduit cannot trap any incident light, since by Snell's basic law of refraction, a ray introduced from a low index media (air) outside the conduit will refract to an angle less than the critical angle, and always must exit from any surface parallel to the entrance surface at the same angle as the angle of entry. Means whereby rays can be introduced through the surface of a conduit at angles greater than the critical angle, and thus facilitating trapping are provided by the use of fluorescent agents as described herein.

These and other objects and advantages of this invention will be readily apparent from the following detailed description of the several embodiments thereof and the accompanying drawings.

In the drawings:

FIGURE 1 is an exploded, perspective view of a single unit, edge emission apparatus embodying this invention.

FIGURE 1a is a view similar to FIGURE 1 of a modified form of the apparatus.

FIGURE 2 is a diagrammatic, sectional view of the apparatus of FIGURE 1 illustrating energy transmission.

FIGURE 2a is a view similar to FIGURE 2 illustrating energy transmission for the apparatus modification of FIGURE 1a.

FIGURE 3 is a perspective view of a modification of the single unit, edge emission apparatus of FIGURE 1 having an edge configuration to enhance the light output.

FIGURE 4 is a sectional, longitudinal view of a modification of the apparatus having a modified conduit configuration which enhances internal reflection.

FIGURE 5 is a sectional perspective view of two edge emission apparatus units having modified conduit configurations to provide a contiguous display surface.

FIGURE 6 is a sectional perspective view of a modification of the apparatus.

FIGURE 7 is a sectional perspective view of a single unit, edge emission apparatus of modified construction.

FIGURE 8 is a sectional perspective view of a single unit, edge emission apparatus of further modified construction.

FIGURE 9 is an exploded perspective view of a single unit, multiple input, edge emission apparatus embodying this invention.

FIGURE 10 is an exploded perspective view of a multi-element, multiple input, edge emission apparatus embodying this invention.

A basic embodiment of the invention is shown in FIGURE 1 which illustrates an apparatus producing edge emission of radiant energy emitted from a stimulated luminophor comprising a fluorescent material. This basic embodiment of the apparatus comprises a radiant energy source 20, a radiation-transmitting conduit 21, and a luminophor 22 which emits secondary radiant energy when stimulated by energy from the source 20.

In this embodiment of the invention, the radiant energy source 20 comprises an electroluminescent device embodying well known, basic constructional techniques in a planar configuration and includes a layer of phosphor material 23 interposed between two planar electrodes 24 and 25. An electric power source 26 of appropriate potential and frequency is connected across the electrodes 24 and 25 to excite the phosphor material and cause emission of radiant energy. The electrode 25 is formed from a material which, in a relatively thin layer, will be transmissive of the radiant energy emitted by the phosphor material 23. Energy thus produced will appear to be emitted from the planar surface of this electrode. The radiation transmitting electrode 25 may be formed from a relatively thin layer of tin oxide which may be formed on the layer of phosphor material 23. The phosphor material may comprise any of the well known phosphors utilized in construction of electroluminescent devices, such as zinc sulfide, zinc oxide, or cadmium sulfide, as the base material and include small amounts of an activator, such as copper, manganese or aluminum with the specific materials selected determined on the basis of the energy emission characteristics desired. This mixture may be diffused in a transparent plastic support medium for structural integrity of the unit. Loss of radiation from the radiant energy source 20 may be minimized by forming the electrode 24 from a material which will be substantially opaque and reflective and thus prevent total loss of back-directed radiation. Copper or preferably aluminum may be utilized in the fabrication of the opaque electrode 24 and these materials may be formed in a relatively thick layer to provide structural integrity for the unit. Although the layer of phosphor material 23 and the two electrodes 24 and 25 are shown in spaced relationship in FIGURE 1, it will be understood that the electroluminescent lamp 20 will be constructed in accordance with the usual techniques with the three elements relatively disposed in surface-contacting engagement forming a single unitary structure.

The radiation transmitting conduit 21 is also of a planar, sheet-form configuration with the planar surface areas being substantially coextensive with the surface area of the radiant energy source 20. This planar sheet-form conduit 21 is of a finite thickness having a peripheral edge surface with a portion of this edge surface being designated as the emitting edge surface 27. The remaining portions of the peripheral edge surface, such as the longitudinal edge surface 28 which can be seen in FIGURE 1, would also form emitting edge surfaces; however, radiation emitted therefrom would be considered as a loss since only the surface 27 is considered as a usable emitting edge for the purposes of this example. For purposes of enhancing internal reflection of radiant energy within the conduit 21, both of the planar surfaces 29 and 30, as seen in FIGURE 2, are preferably made specular to enhance the respective reflective properties. Materials found suitable for the fabrication of the conduit include such well known materials as glass, and the light-transmitting plastics. Materials such as these are required for this particular embodiment since the radiant energy which is to be transmitted by the conduit 21 and emitted from the surface 27 thereof is of wavelengths which are within the visible spectrum. The particular materials selected for the conduit 21 would be determined from a consideration of the wavelengths of the radiant energy which is to be transmitted and the material will be selected to optimize the transmission of this energy. For example, the radiant energy may be within either the infra-red or the ultraviolet region and thus would not be visually observable.

The secondary-radiation emitting luminophor 22 is also of planar sheet form and is substantially coextensive with the conduit 21 and may be conveniently formed as a coating or film on a surface of the conduit 21. Materials utilized in the fabrication of the fluorescent layer 22 may include such well known fluorescent materials as fluorescein and rhodamine compounds. The specific material selected for the luminophor 22 must be compatible with the radiant energy emitted by the source 20 so that it will be excited by incident radiation from the source and emit the secondary radiation. It is also necessary that the material be formable into a body capable of transmitting radiant energy of both primary and secondary emission wavelengths. For example, the material may be formable as a solute in a plastic. It will be understood that a characteristic of a typical luminophor is that radiant energy absorbed by the luminophor of a particular wavelength will result in excitation of that luminophor to emit radiation of a relatively longer wavelength. This is in accordance with the principles of Stoke's law of fluorescence. Another characteristic of the luminophor to be considered in selection of a particular material is the energy transmission capability. Preferably, the luminescent material is selected to be absorptive of radiant energy in the wavelength region of the radiant energy source 20 and transmissive of radiant energy emitted by the luminophor. Selecting a luminophor having a relatively high transmission capability as to its secondary emission radiation will enhance efficiency of operation of the device through avoidance of self-absorption. The effectiveness of the fluorescent emission may be substantially increased through the addition of an opaque reflector panel 31. This reflector panel 31 is disposed at the side of the fluorescent layer 22 opposite the conduit 21 and will substantially reflect any radiation emitted by the electroluminescent lamp 20 which has not been completely absorbed by the luminophor, thus providing additional opportunity for absorption and consequent increase in fluorescent radiation.

In the embodiment illustrated in FIGURE 1, the fluorescent layer 22 is shown supported in spaced relationship to the conduit 21 and the reflector panel 31 is also shown in spaced relationship to the fluorescent layer 22. In practice, the fluorescent layer 22 is preferably formed on the adjacent surface of the conduit 21. The reflector panel 31, however, is not formed on the adjacent surface of the fluorescent layer 22 but is rather simply placed in close physical juxtaposition to it, to a degree which will not admit of optical contact. Similarly, the primary radiation source is brought into close physical juxtaposition to the conduit surface 29 but not into optical contact. The reason for this is to avoid introduction of any diffusing surface on the bounding surfaces of the conduit. These spaces are indicated by the arrows designated by the numerals 32 in FIGURE 1 and the similarly identified regions in FIGURE 2. In forming the fluorescent layer 22 directly on the surface of the conduit 21, such as by coating this surface with a suitable fluorescent dye in a suitable transparent vehicle, it must be remembered that the fluorescent material should be selected to have an optical index of refraction which is equal to the index of refraction of the conduit 21. Although selection on this basis is preferred, the index of refraction of the fluorescent material may be somewhat less than that of the conduit without detracting from the performance in inducing internal reflection within the conduit. If the fluorescent layer 22 is of a higher index than the conduit 21, some radiant energy will be trapped within the fluorescent layer.

Substantial internal reflection of radiant energy within the conduit 21 requires that the conduit and the fluorescent layer 22 have an index of refraction which is greater than the index of refraction of a medium adjoining the exposed surfaces of each. The medium next adjoining the surfaces of the conduit 21 and the fluorescent layer 22 may be air having an index of refraction of 1.00 and thus comply with the requirements for producing internal reflection or it may be a suitable low index glass or plastic of some higher value index which is still less than the index of the conduit and fluorescent layer. The complete mechanical structure for supporting these several elements in the desired relationship is not illustrated in FIGURE 1, as this structure does not form a part of this invention and such structures are well known to those skilled in this particular art. It will suffice to say that this mechanical structure would provide the necessary mechanical support to maintain the spacing between surface 29 of the conduit 21 and the adjacent primary energy source 20 and between the surface 30 of the fluorescent layer 22 and the reflective panel 31. In practice, it has been found that these surfaces may be brought into intimate mechanical contact without inducing a significant degree of optical contact, and thus unified and rigid mechanical structures are easily realized.

The phenomenon of internal reflection within a radiation transmitting conduit 21 is graphically illustrated in FIGURE 2. An elemental particle 23a of the electroluminiscent phosphor material 23 is shown as being excited into emitting a ray of energy R which is substantially normal to the emitting surface of the electroluminescent lamp 20 and thus traverses the conduit 21 to the luminophor of fluorescent layer 22. This energy thus transmitted will be absorbed by an elemental particle 22a of the luminophor 22 causing this particle to fluoresce and emit the secondary radiation which will be of a substantially longer wavelength than the exciting radiation. Radiation thus emitted by the luminophor particle 22a may follow the path designated L1 in FIGURE 2. Assuming that the index of refraction of the luminophor 22 is somewhat less than the index of refraction of the conduit 21, it will be seen that this ray L1 will be bent toward the normal at the contacting interface of the luminophor and conduit. After passing this interface, the ray of energy L1 will traverse the conduit 21 to the opposite surface 29 of the conduit. This refracted ray L1 now having traversed the conduit 21 will be incident to the interface surface 29 at an angle $\theta_i$ relative to a normal to this surface. If the angle of incidence $\theta_i$ exceeds or is equal to a critical angle $\theta_c$, ray L1 will be totally internally reflected within the conduit 21 and will be reflected from the interface surface by the angle $\theta_r$ which is equal to the angle $\theta_i$. This critical angle $\theta_c$ determining the total internal reflection of an incident ray is given by the equation $$\theta_c = \sin^{-1}\frac{N_2}{N_1}$$

It can be seen from this equation that the critical angle resulting in internal reflection is dependent on the relative indexes of refraction $N_1$ and $N_2$ of the conduit 21 and of the adjoining medium which compresses the air space 32 in this instance. In the case where the conduit 21 is fabricated from either a plastic or glass material having an average index of refraction of 1.50, it will be seen that this critical angle will be of the order of 42° to result in total internal reflection of ray of energy. The ray of energy L1 thus totally internally reflected within the conduit 21 will progress longitudinally through the conduit until reaching the luminophor 22 whereupon it will refract away from the normal to an angle equal to its original entry angle. Continuing, the ray will be totally internally reflected from the surface 30 of the luminophor 22 in the same manner as for surface 29. Subsequently, this ray L1 will exit the conduit 21 at the edge surface 27 as the angle of incidence to this orthogonal edge surface will be less than the critical angle of $\theta_c$. A second refracted ray L2 is also shown being subjected to internal reflection within the conduit 21. This ray L2 is also indicated as being emitted from the elemental luminescent particle 23a but is shown to have a smaller angle of incidence $\theta_i$. Since the angle of incidence $\theta_i$ is less for the refracted ray L2, this ray will be transmitted longitudinally through the conduit 21 and will be emitted at the edge surface 27 at a relatively greater angle than the ray L1.

Several basic corollaries of Snell's law of refraction may be restated to help in an understanding of these various phenomena as employed in the illustrated embodiment. These are:

(1) Any ray originating in a lower index media may traverse into a higher index media.
(2) A ray in a high index media may always retraverse to a lower index media, if it originated in that lower index media.
(3) Critical angles exist only in traversing from higher to lower index media.
(4) The critical ray angle for a high index media with air, when traced through its refractions in lower index media, will also be refracted to the critical angle of the lower index media with air: ergo, the critical ray is an identity for all lower index media.

Radiant energy emitted from the luminophor 22, as previously indicated, will be emitted in a substantially isotropic pattern of intensity. Thus, radiation will be emitted at all angles into the conduit 21. Some of this radiation will not be internally reflected and will be ineffective in producing edge emission as such radiation will be transmitted outside of the conduit 21 toward the electroluminescent radiation energy source 20. All other radiation emitted by the luminophor which will exceed the angle of incidence $\theta_c$ will be internally reflected until subsequently encountering a non-parallel plane at an angle less than $\theta_c$, such as an orthogonal edge surface. Since the emitting surface of the luminophor 22 may be increased within practical limits to a relatively large degree by increasing the dimension of depth behind the emitting edge as compared to the thickness of the conduit 21 and the corresponding edge emission surface 27, it will be seen that the intensity of the emission will be greatly increased over that from directly viewing the emitting surface of the luminophor, by virtue of the increasing amount of trapped rays.

The apparatus may be constructed with a second luminophor layer 33 which is interposed between the conduit 21 and the primary radiation source 20, the electroluminescent lamp in this instance, as in the modified structure illustrated in FIGURE 1a. The effect of the second luminophor layer 33, which is also substantially coextensive with the conduit 21 and may be formed as a film or coating on the surface 29 of the conduit, is to further increase absorption of the energy from the primary radiation source 20 and thereby increase secondary, emission generation. This second luminophor layer 33 will also be formed of materials selected in consideration of the same characteristics as for the luminophor layer 22 and this embodiment of the apparatus may utilize the same constructional techniques previously discussed. It will be noted from FIGURES 1a and 2a that the elements which were previously described in conjunction with the apparatus of FIGURES 1 and 2 are given the same identifying numerals and perform the same functions. In this embodiment, however, the air space 32 adjacent the primary energy source 20, is now also bounded by a surface 34 of the second luminophor layer 33.

Internal reflection in this embodiment is graphically illustrated in FIGURE 2a and is seen to follow the same principles. A second ray of energy R1 is shown as emitted from a second elemental particle 23b of the electroluminescent material 23 and traversing the space 32 into the luminophor layer 33 where it is absorbed by an elemental luminophor particle 33a. The particle 33a fluoresces and emits a ray of secondary radiation which is assumed for illustrative purposes to follow the path designated L3. This path is also assumed to meet the critical angle criteria previously discussed for total internal reflection and the ray L3 will be reflected between the surfaces 30 and 34. Similarly, the ray L1 emitted by particle 22a in luminophor layer 22 will be reflected between surfaces 34 and 30. In each case, the illustrative rays L1 and L3 will subsequently exit the conduit 21 at the edge surface 27.

As previously indicated, some of the internally reflected radiation may be lost or considered ineffective as it will be emitted from portions of the edge surface which may not be viewed by an observer or considered effective as an edge emission surface. Loss of radiation through such ineffective edge surfaces may be substantially obviated through utilization of a construction of the apparatus such as is shown in FIGURE 3. This apparatus is formed substantially as shown in FIGURE 1 and comprises a radiant energy source 35, a radiation transmitting conduit 36, a luminophor layer 37, and an opaque reflector panel 38. As in the apparatus of FIGURE 1, the radiant energy source 35 is of the electroluminescent type comprising a layer of phosphor material 39 interposed between two planar electrodes 40 and 41. An electric power source 42 is connected across the electrodes 40 and 41 to supply an electric potential of the desired voltage and frequency for excitation of the phosphor material 39 and emission of primary radiation with electrode 41 being transmissive of the radiation emitted by the activated phosphor material. It will be understood that this embodiment is also constructed with due consideration for the relative refractive indexes previously discussed to obtain internal reflection. A portion of the peripheral edge surface of the conduit 36 is designated as the emitting edge surface indicated at 43 and may be viewed by an observer. The remaining portions of the peripheral edge surface are coated with a layer of opaque material 44 which is selected on the basis of its capability of reflecting the secondary radiant energy. Thus, radiant energy which is internally reflected within the conduit 36 but which is not transmitted in the first instance toward the emitting edge surface 43 will be incident to a surface bounded by the layer of opaque reflective material 44 and will be reflected back into the conduit 36 for further transmission. Radiant energy thus emitted by the luminophor 37 and transmitted through the conduit 36 in a generally transverse direction to the edge emission axis will eventually be emitted at the exit face or edge surface 43 of the conduit. This results from the fact that this internally reflected radiation will be reflected by the opaque reflective material 44 at the respective portions of the peripheral edge of the conduit 36. Reflection of radiation thus transversely transmitted in the conduit 36 is further enhanced through appropriate shaping of this particular portion of the peripheral edge surface in such a manner that a normal to this surface portion will be inclined toward the edge emission surface 43. As shown in FIGURE 3, this edge surface is of an arcuate configuration.

The configurations illustrated in FIGURES 1 and 3 are of the planar type with the emitting edge surface being a flat, rectangularly shaped area. This particular configuration provides an optimum shape for apparatus which may be incorporated in indicating devices. Several such units which are independently operable may be combined in a unit to form a plurality of spaced, parallel lines that may be independently activated and form a bar of illumination. It will be apparent that this configuration is not a limiting factor and the apparatus may be otherwise constructed. For example, the transverse dimension of the conduit and coextensive portions of the radiant energy source and the luminescent material may be reduced to provide a square-shaped rod. Also, the edge perimeter of the emitting surface need not be of the illustrated straight-line configuration but may be arcuate or have a particular symbol shape. Furthermore, the surface need not be planar with only two-dimensional characteristics but have a three-dimensional configuration.

A configuration which further enhances the capability of transmitting and inducing internal reflection of radiation toward an edge emission surface or exit face is illustrated in FIGURE 4. This apparatus comprises a radiation transmitting conduit 50 which may be of elongated rod-form or of planar sheet form with one end or edge surface designated as the exit face 51. Two of the opposed longitudinal surfaces of the conduit are of a serrated configuration forming several sawtooth surface elements 52. Each element 52 of the longitudinal surfaces is relatively divergent to the longitudinal axis in the direction of the desired longitudinal transmission of radiation. Formed on each of the sawtooth elements 52 is a luminophor layer 53. Adjacent to the outer surfaces of the luminophor layer 53 at each side of the conduit 50 is a primary radiant energy source 54 which may comprise an electroluminescent lamp of the same coextensive planar construction as previously described in conjunction with the embodiments of FIGURES 1 and 1a. The energy sources 54 are positioned in spaced relationship to the luminophor layers thus providing the spaces 56 which comprise a suitable media to preserve the necessary index of refraction relationships for internal reflection. An electrical power source 55 of suitable voltage and frequency is connected to each of the energy sources 54 to excite these sources into emission of energy. The primary radiation thus emitted by the sources 54 will result in excitation of the several luminophor elements 53 on either side of the conduit 50 to emit secondary radiation which will be subsequently introduced into the conduit 50. In the case of the FIGURE 1 configuration, it was preferred to include a reflector panel at one side of the luminophor layer to prevent loss of secondary radiation. This loss is not a factor in the configuration shown in FIGURE 4 due to the presence of two primary energy sources 54. If desired, one energy source 54 may be omitted and replaced by a reflective panel as in the case of the FIGURE 1 and 1a embodiments.

A single ray of radiation thus emitted by the luminophor is diagrammatically indicated in FIGURE 4 and its transmission path is illustrated through the conduit 50. As can be seen by reference to FIGURE 4, this ray L4 is incident to an opposed surface 52 of the conduit 50 at an angle $\theta_1$ which exceeds the critial angle for this particular material. Consequently, the ray L4 will be totally internally reflected within the conduit 50 and will emerge from the conduit at the exit face 51. It will be apparent from a consideration of the radiation distribution pattern from each of the luminophor elements 53 that a greater proportion of the secondarily emitted radiant energy will be incident to an opposed surface of the conduit 50 at an angle which is greater than the critical angle and will be subjected to internal reflection than in the configuration shown in FIGURE 1 where the surfaces of the conduit are planar and parallel. Such a sawtooth configuration has been found to favor the forward throw of energy over the rearward thus providing a more efficient mechanism. While both opposed surfaces of the conduit 50 in the embodiment shown in FIGURE 4 are of a serrated configuration, it will be understood that only one surface need be serrated to obtain the advantages of this construction. It will also be apparent that the dual serrated surface configuration will further enhance the direction of transmission over a single serrated surface.

A rod-type configuration of the apparatus is illustrated in FIGURE 5. In this embodiment, the apparatus comprises a radiation transmitting conduit 60 which may be of a square, cross-sectional shape as shown, or cylindrical. Surrounding a portion of the conduit 60 is a radiation-emitting luminophor layer 61 which is also of a tubular configuration and may be formed as a film on the conduit surface. This luminophor preferably has an index of refraction which is equal to or slightly less than the index of refraction of the conduit 60. Surrounding the tubular luminophor 61 is a tubularly-shaped primary radiant energy source 62 which advantageously may be an electroluminescent lamp and which is optically spaced from the luminophor by a space 65 of appropriate refractive index to provide internal reflection. A suitable electric power source 64 is connected to the electroluminescent lamp 62. One end of the conduit 60 projects a distance outwardly from the tubular luminophor 61 and radiation source 62 and terminates in an edge emission surface 63. The side walls of the conduit projecting outwardly from the luminophor 61 are preferably formed in divergent relationship to form an edge emission surface 63 which is relatively expanded in both transverse dimensions relative to the main body of the conduit 60. This transverse expansion is such that the edge emission surface 63 will be equal to, of not greater, than the cross-sectional area of the radiation source 62.

This construction thus permits assembly of two similarly constructed units into a multi-element device where the edge emission surfaces 63 of each unit will be contiguous without permitting interference between each unit and thus form a substantially continuous viewing surface. Additional units of a similar construction may be assembled in the same manner to construct a device having a large number of edge emission surfaces forming a composite viewing surface with elemental surface areas that may be selectively and independently illuminated as desired.

FIGURE 6 illustrates a further modified construction of the apparatus of this invention. In this embodiment, an elongated, radiation transmitting conduit 68 of rod-like configuration having a square, cross-sectional form is provided with a luminophor layer 69 extending along one longitudinal surface thereof. A primary radiation source 70, which again may be an electroluminescent lamp, is superimposed on the luminophor layer 69 but not in optical contact therewith as in the structure of FIGURE 4 and is driven by a suitable electric power source 71. This optic spacing is represented by the air space 74 which maintains the relative refractive index relationship necessary for internal reflection. The luminophor 69 is formed from a material selected to have an index of refraction which is equal to or slightly less than the index of refraction of the conduit 68 and thus satisfies the conditions required for the phenomenon of internal reflection. A layer of opaque, reflective material 72 is formed on the remaining three longitudinal surfaces of the conduit 68. This reflective coating thus assures that the radiation emitted by the luminophor 69 and introduced into the conduit 68 will be reflected for emission at an end surface 73 of the conduit in addition to the previous advantages cited for reflective layers in other embodiments.

An apparatus of modified rod configuration is illustrated in FIGURE 7 which is essentially the converse of the configuration shown in FIGURE 5. The apparatus of FIGURE 7 comprises an elongated radiation transmitting conduit 75 having a square, cross-sectional shape and an end edge emission surface 76 formed at the opposite end of that visible in FIGURE 7. An elongated socket 77, also of square, cross-sectional shape, is formed coaxially along one axis of the conduit 75 with one end of the socket open at the end of the conduit seen in FIGURE 7. Disposed within the socket 77 is an elongated, tubular form fluorescent or luminophor element 78 having the outer surface thereof in contacting engagement with an adjacent interior surface of the socket 77. Disposed interiorly of the fluorescent element 78 is an elongated primary radiation source 79. This radiation source 79 may also be of tubular form and is connected to a suitable source of electric power 80 of appropriate voltage and frequency but the source is optically separated from the fluorescent element by an air space 81 to maintain the refractive index relationship necessary for internal reflection. Assuming that the index of refraction of the conduit 75 is greater than the index of refraction of the surrounding medium, it will be apparent that the secondary radiation emitted by the luminophor 78 due to excitation by the radiant source 79 will result in internal reflection and transmission of such refracted radiant energy longtiudinally down the conduit 75. This interiorly reflected radiation will subsequently be emitted at an end edge of the conduit and, in particular, will be emitted at the end edge emission surface 76. This particular configuration is also readily adaptable to assembly into multi-element arrays thereby forming a single, substantially contiguous viewing surface.

The embodiment of the apparatus illustrated in FIGURE 8 combines the rod-like configurations with the relative arrangements of the elements as illustrated in FIGURE 1. This modification of the apparatus comprises an elongated rod-form conduit 85 which is formed from a material having an index of refraction which is greater than that of the surrounding medium. Disposed in circumscribing relationship to a portion of the elongated conduit is a tubular primary radiation source 86. This radiation source 86 may comprise an electroluminescent lamp of tubular configuration and which is connected to a source 87 of electric power with the construction such that there will be an air space 90 relative to the conduit 85 to obtain the refractive index relationship necessary for internal reflection. A fluorescent or luminophor element 88, also of rod-like configuration, is centrally embedded within the conduit 85 within the effective radiation pattern of the primary radiant energy source 86. Radiation thus emitted by radiation source 86 will be transmitted transversely through the conduit 85 and excite the luminophor element 88 resulting in the emission of secondary radiation which will be refracted in the conduit 85. Radiation thus emitted from the luminophor element 88 and subjected to total internal reflection will result in longitudinal transmission of that radiation for subsequent emission from the conduit at an end emission face such as 89.

An apparatus embodying this invention may also be constructed utilizing a plurality of radiation source inputs for exciting respective luminescent elements in producing an edge emission type output from a single radiation transmitting conduit. Such an apparatus is illustrated in FIGURE 9 where the several elements are relatively spaced for clarity of illustration. This apparatus comprises a single radiation transmitting conduit 95 of planar form which is interposed between a multi-element primary radiation source 96 and a multi-element fluorescent or luminophor array 97. Forming the radiation source 96 is a single layer of phosphor material 98 which is interposed between a multi-element electrode array 99 and a single radiation transmissive or transparent electrode 100 of planar configuration. This radiation source which comprises a multi-element, electroluminescent lamp is arranged with the transparent electrode 100 disposed adjacent to the radiation transmitting conduit 95 but optically spaced therefrom by media having an appropriate refractive index to provide internal reflection. Forming the multi-element electrode array 99 in this specific embodiment are three electrically discrete electrode elements 101, 102 and 103. These electrode elements are of a rectangular shape and are relatively spaced in parallel relationship extending transversely to the axis of desired radiation transmission in the conduit 95. In this instance, the secondary radiation emitted by the luminophor array 97 would be internally reflected in the conduit 95 so as to exit that portion of the peripheral edge thereof which is designated as an edge emission surface and which is identified by the numeral 104. A suitable electrical power source 105 is connected across the transparent electrode 100 and each respective electrode element 101, 102 and 103. The transparent electrode 100 thus forms a common ground for the electroluminescent lamps with each of the electrode elements 101, 102 and 103 preferably selectively and independently connectable with the electrical power source 105 by respective switching means 106, 107 and 108. Closing of any one of the switching means 106, 107 or 108 will result in the application of an electric potential across only that portion of a layer of phosphor material 98 which is coextensive with the respective electrode element with consequent activation of the phosphor material into emission of primary radiation which will be transmitted through the transparent electrode 100 and the radiation transmitting conduit 95 to the luminophor array 97.

Disposed adjacent the opposite face of the radiation transmitting conduit 95 is the multi-element luminophor array 97. The multi-element luminophor array 97 is constructed with three discrete luminophor elements 110, 111 and 112 which are of the same configuration as a respective one of the electrode elements and coextensive therewith. The three luminophor elements 110, 111 and 112 may be directly formed on a surface of the radiation transmitting conduit 95 as in accordance with the constructional techniques described in conjunction with the apparatus shown in FIGURE 1. An opaque reflector panel 113 may also be included in the structure and is disposed adjacent the opposite surface of the luminescent elements to increase efficiency.

In this particular embodiment of the apparatus, each luminophor element 110, 111 and 112 is formed from a material which is capable of fluorescing in response to excitation by the source 96 with the selected fluorescent or luminophor materials preferably emitting secondary radiation within dissimilar wavelength spectrums. For example, each of the luminophor elements may be formed from materials which will emit radiation within the three basic color spectrums, red, blue and green. Thus, activation of a respective portion of the phosphor material 98 through closing of a respective one of the switch means 106, 107 or 108 will result in fluorescing of the respective luminophor element 110, 111, or 112. Radiation of this particular wavelength spectrum thus emitted by the respective luminophor elements 110, 111 or 112 will be subsequently introduced into the radiation transmitting conduit 95 and, due to the phenomenon of internal reflection, will exit the conduit at the edge emission surface 104. Simultaneous closing of more than one switching means 106, 107 or 108 will result in simultaneous excitation of more than one luminophor element and the consequent emission of radiation within the plurality of wavelength spectrums associated with the respective luminophor elements thus activated. The consequence of such simultaneous emission from the luminophor elements is that the radiation exiting the edge emission surface 104 will be a composite of the wavelength spectrums introduced into the radiation transmitting conduit 95. In the case of this color arrangement, the output will thus be a color hue resulting from the combination of the respective luminophor emissions.

Through appropriate selection and configuring of the electrode elements and the luminophor elements 110, 111 and 112 and with due regard to the spectral response of the specific luminophor elements, an apparatus may be constructed which will provide a uniform output intensity irrespective of the specific luminophor elements that may be excited. In a basic form of the apparatus it may be desired to obtain such uniformity of output intensity; however, in a more defined apparatus, it may be desirable to obtain a variation in the output of radiation for each of the respective luminophor elements to reflect a variation in the input electric potentials that may be applied to the respective portions of the electroluminescent radiation source 96. Such a variation in the magnitude or frequency of the electric potential that may be applied to the respective electrode elements 101, 102 and 103. In this instance, each of the electrode elements would be supplied from an independent source of electric potential as is diagrammatically illustrated in FIGURE 9 by the two auxiliary electrical power sources 114 and 115. Each auxiliary source 114 and 115 would be selectively connectable in circuit with a respective electrode element 101 or 103, respectively, by independently operable switch means 116 and 117. Consequently, variation of the voltage and frequency of the electric power applied to each of the respective electrode elements 101, 102 and 103 will result in a varying degree of emission from the respective portion of the phosphor material 98. This variation in emission from the phosphor material 98 will produce a corresponding emission from the respective luminophor elements 110, 111 and 112 which will reflect the input applied to the apparatus by the respective potential sources 105, 114 and 115.

The apparatus illustrated in FIGURE 9 may be described as a single unit, multi-element display apparatus; that is, two or more inputs, three in this instance, may be applied to a single radiation transmitting conduit for emission at a single edge emission surface. Such a limitation as a single unit or a three-element configuration is not contemplated and the scope of the invention includes multi-unit apparatus as well as units which comprise more or less than three distinct luminophor or fluorescent elements. An example of such a multi-unit, multi-element apparatus is shown in FIGURE 10. The units which are each designated by the numeral 120, are assembled in a relatively reverse relationship in order that a single, opaque, reflector panel 121 may be utilized. Disposed adjacent to the opposite surfaces of the reflector panel 121 but in optically spaced relationship thereto are the respective luminophor element arrays 122. In this embodiment, each luminophor element array 122 comprises five luminophor elements 123, 124, 125, 126 and 127 which are rectangularly shaped sheets arranged in a planar configuration. Arranged immediately adjacent each luminophor element array 122 is a radiation transmitting conduit 128. Each radiation transmitting conduit 128 is subdivided into separate conduit portions which are coextensive with respective luminophor elements 123 through 127. Adjacent conduit elements are separated by opaque separators 129 which extend longitudinally of the conduit and thus prevent interference as between adjacent conduit elements.

A radiation source 130 is disposed in optically-coupled relationship to the respective conduits 128. This radiation source 130 may again be of the electroluminescent-type constructed with a transparent electrode 131, a layer of phosphor material 132 and an electrode array 133. The electrode array 133 includes a plurality of electrode elements numbering five in this embodiment and identified by the numerals 134 through 138. Each of these electrode elements is formed from an opaque material and is of a configuration to be coextensive with a respective element of the radiation transmitting conduit 128 and element of the luminophor array 122. A single electric power source 139 is diagrammatically illustrated as connected to each of the transparent electrodes 131 and selectively connectable to respective ones of the electrode elements 134 through 138 by multi-contact switch means generally indicated at 140. One or more contacts may be closed as desired and the respective edge emission surfaces will be illuminated.

It will be readily apparent that an apparatus embodying this invention may be constructed in any one of several configurations as deemed advantageous for a particular application. The output intensity for a particular device is substantially increased over the output from a direct radiation device having the same viewing surface area. This advantage results from the stimulation of a luminophor to emit radiation which is subsequently subjected to internal reflection in a radiation transmitting conduit for emission at an edge surface.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:
1. Apparatus comprising
 (A) a radiation-transmitting conduit having an elongated transmission axis and a radiation receiving surface extending axially, said conduit being formed from a material capable of optically transmitting radiant energy of wavelengths within a first wavelength spectrum and having an index of refraction of $N_1$,
 (B) a radiation-emitting luminophor element disposed in optically coupled relationship to the radiation-receiving surface of said conduit and emitting secondary radiation of wavelengths within said first wavelength spectrum in an isotropic distribution pattern when said luminophor is subjected to and excited by incident primary radiation of wavelengths within a second wavelength spectrum, said luminophor element being formed from a material having an index of refraction $N_{1a}$ not greater than $N_1$ and transmissive of radiation of wavelengths in said first and second wavelength spectrums and disposed in superposed relationship to said conduit radiation receiving surface,
 (C) a primary-radiation source emitting radiation of wavelengths within said second wavelength spectrum and disposed in superposed relationship to said luminophor element to effect excitation thereof, and
 (D) media adjacent exposed axial surfaces of said luminophor element and said conduit having an index of refraction $N_2$ that is less than $N_1$ or $N_{1a}$ such that

$$\frac{N_2}{N_1}=\sin^{-1}\theta c \text{ or } \frac{N_2}{N_{1a}}=\sin^{-1}\theta c \text{ for the respective element}$$

whereby radiation transmitted interiorly of said conduit or said luminophor and incident to a respective exposed surface thereof at an angle $\theta_i$ greater than the critical angle $\theta_c$ will be internally reflected at said surface and transmitted axially of said conduit.

2. Apparatus according to claim 1 wherein said radiation-transmitting conduit is interposed between said primary radiation source and said luminophor element, said conduit also being transmissive of radiation of wavelengths within said second wavelength spectrum.

3. Apparatus according to claim 1 wherein said luminophor element is interposed between said primary radiation source and said radiation transmitting conduit, said luminophor element being absorptive of radiation of wavelengths within said first wavelength spectrum.

4. Apparatus according to claim 1 wherein said radiation-transmitting conduit is formed with a peripheral edge surface through which transmitted radiation is emitted, with a portion of said edge surface being coated with a radiation-reflective material to reflect incident radiation internally of said conduit toward an uncoated portion of said edge surface.

5. Apparatus according to claim 4 wherein the coated edge portions of said peripheral edge surface are of a predetermined configuration to result in increased internal reflection of incident radiation toward said uncoated portion of said edge surface.

6. Apparatus according to claim 1 wherein said radiation-transmitting conduit includes a peripheral edge surface with a portion thereof forming a radiation-emitting surface, said edge surface other than said radiation-emitting surface being of a predetermined configuration to result in increased internal reflection of incident radiation toward said emitting surface.

7. Apparatus according to claim 1 wherein said axially extending surface includes a portion which is relatively divergent to the elongated axis for enhancing internal reflection of radiation in a predetermined direction along the longitudinal axis.

8. Apparatus according to claim 7 wherein said axially extending surface includes at least one other portion which is relatively divergent to the elongated axis for enhancing internal reflection of radiation in the same predetermined direction, said other portion being disposed in longitudinally aligned relationship to said first named portion.

9. Apparatus according to claim 1 wherein said conduit is formed with at least two discrete, axially extending surfaces, each of said surfaces including a portion which is relatively divergent to the longitudinal axis for enhancing internal reflection of radiation in a same predetermined direction along the longitudinal axis.

10. Apparatus according to claim 9 wherein said two discrete surfaces are disposed in opposed relationship.

11. Apparatus according to claim 9 wherein each of said axially extending surfaces includes at least one other portion which is relatively divergent to the elongated axis for enhancing internal reflection of radiation in the same predetermined direction, said other portion being disposed in longitudinally aligned relationship to said first named portion in the respective surface.

12. Apparatus according to claim 1 wherein said luminophor element is formed on said conduit surface.

13. Apparatus according to claim 1 wherein said primary radiation source comprises an electroluminescent lamp structure formed with at least one radiation-transmissive electrode, said lamp structure being disposed with said radiation transmissive electrode juxtaposed to said conduit radiation receiving surface.

14. Apparatus according to claim 1 wherein said conduit is formed with another axially extending surface in opposed relationship to said radiation receiving surface and said luminophor element is formed on said other surface.

15. Apparatus according to claim 1 wherein said radiation-emitting luminophor element comprises at least two discrete elements and said primary radiation source comprises at least one discrete source for each of said luminophor elements, each of said discrete, primary radiation sources being selectively and independently energized.

16. Apparatus according to claim 1 which includes at least one other radiation transmitting conduit provided with a respective radiation-emitting luminophor element and a primary radiation source.

17. Apparatus according to claim 16 wherein each of said radiation-emitting luminophor elements comprises at least two discrete elements and each of said primary radiation sources comprises at least one discrete source for each of said luminophor elements, each of said discrete primary radiation sources being selectively and independently energized and optically coupled with a respective one of said luminophor elements.

18. Apparatus according to claim 16 wherein each of said conduits is formed with an end edge emission surface having an area at least equal to the combined cross-sectional area of said respective luminophor, radiation source and co-extensive portion of said conduit, said conduits being supported in relatively assembled relationship with the end edge emission surfaces of adjacently disposed conduits being contiguous.

References Cited
UNITED STATES PATENTS

| | | | |
|---|---|---|---|
| 2,975,318 | 3/1961 | Nicoll | 313—108 X |
| 3,317,738 | 5/1967 | Piepenbrink et al. | 250—219 X |
| 3,339,075 | 8/1967 | Szepesi | 313—108 X |
| 3,426,212 | 2/1969 | Klaas | 250—226 |

WALTER STOLWEIN, Primary Examiner

U.S. Cl. X.R.

250—227; 313—108